Feb. 13, 1940.  W. WIEBECKE ET AL  2,190,556
MEANS FOR PULLING DOWN PIT PROPS OR PILLARS
Filed Dec. 23, 1937  6 Sheets-Sheet 1
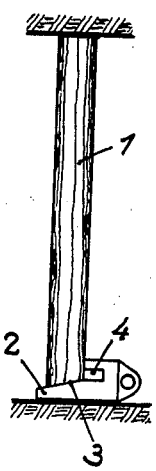
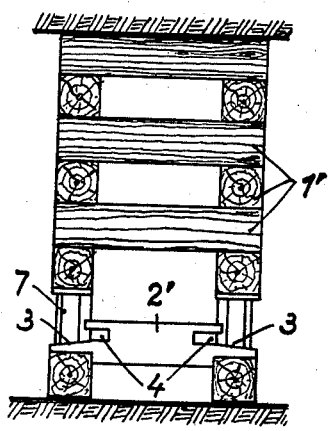
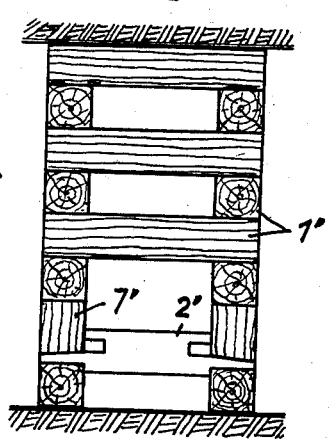
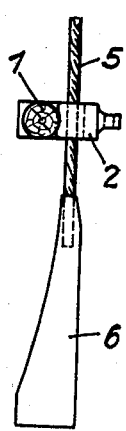
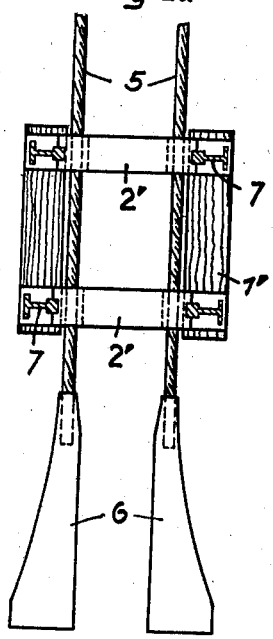
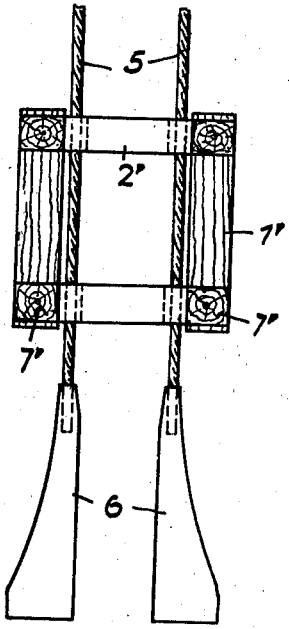
Inventors:
W. Wiebecke,
F. W. Moll and
W. Hardieck
By Young Emery & Thompson
Attorneys Feb. 13, 1940.   W. WIEBECKE ET AL   2,190,556
MEANS FOR PULLING DOWN PIT PROPS OR PILLARS
Filed Dec. 23, 1937   6 Sheets-Sheet 2
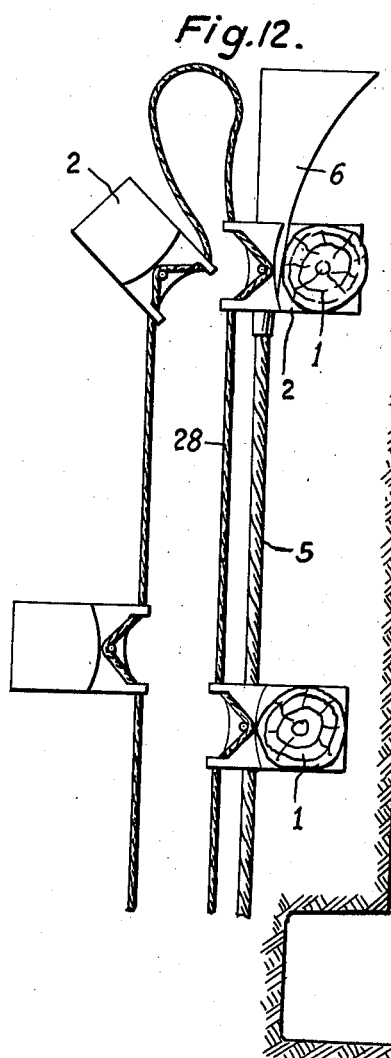
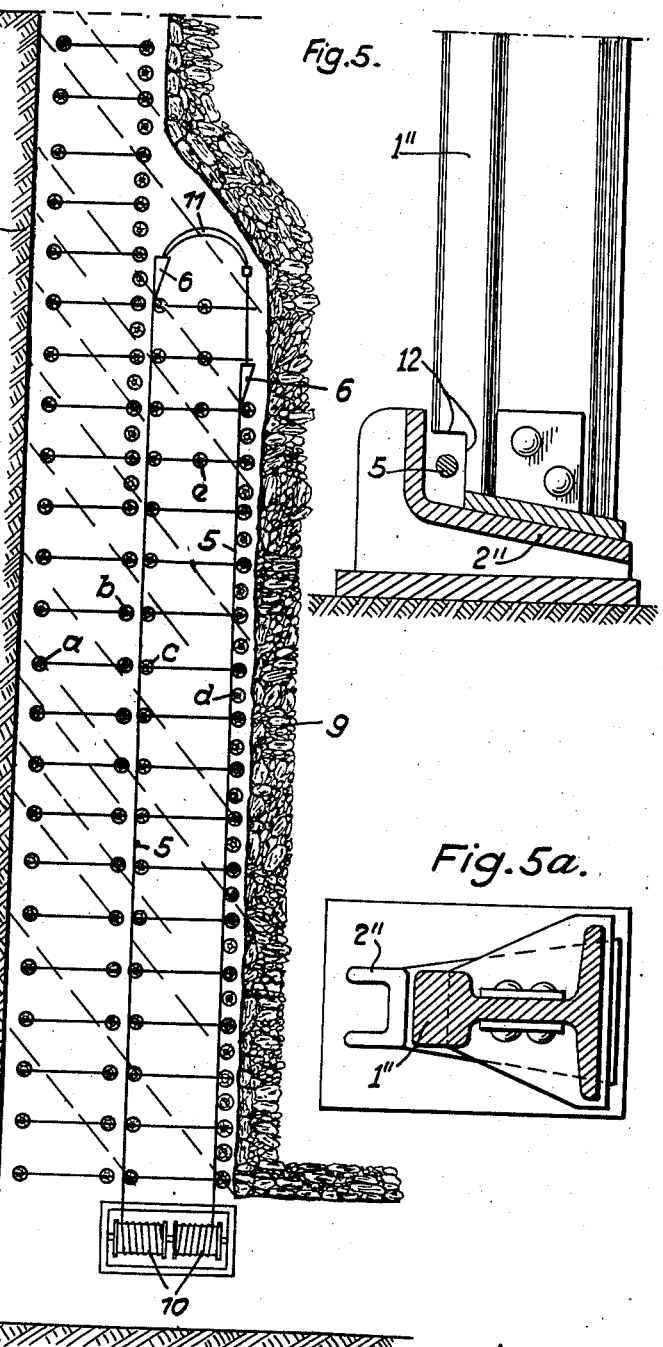
Inventors:
W. Wiebecke,
F. W. Moll and
W. Hardieck
By Young Emery & Thompson
Attorneys

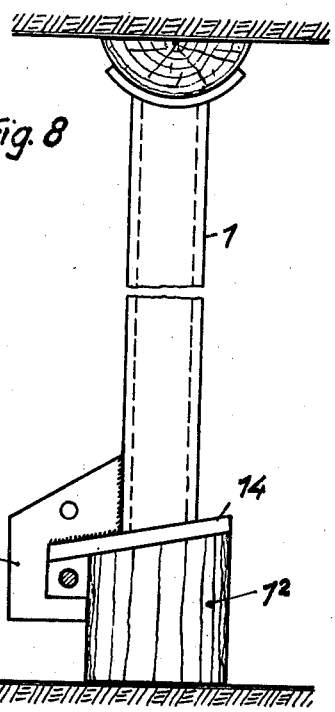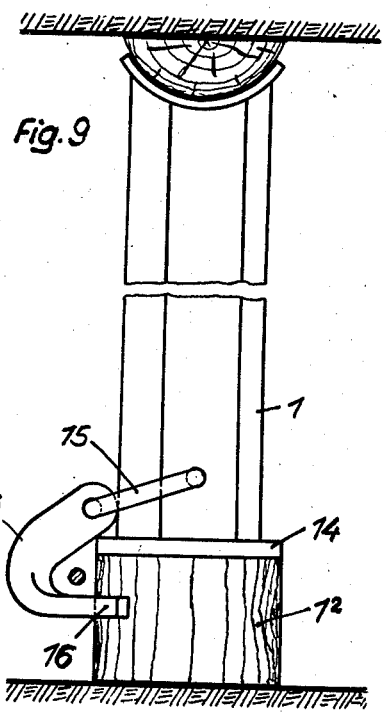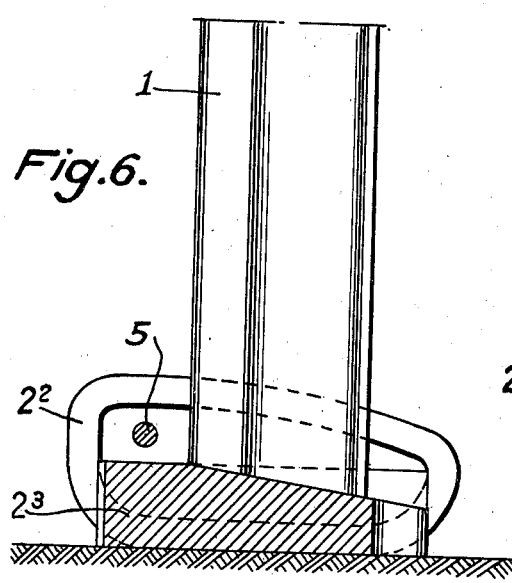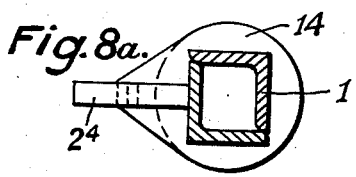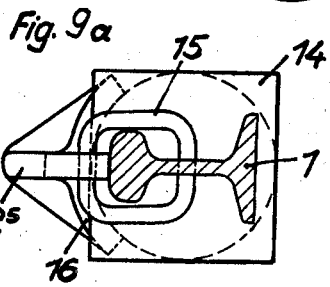

Feb. 13, 1940.  W. WIEBECKE ET AL  2,190,556
MEANS FOR PULLING DOWN PIT PROPS OR PILLARS
Filed Dec. 23, 1937    6 Sheets-Sheet 4
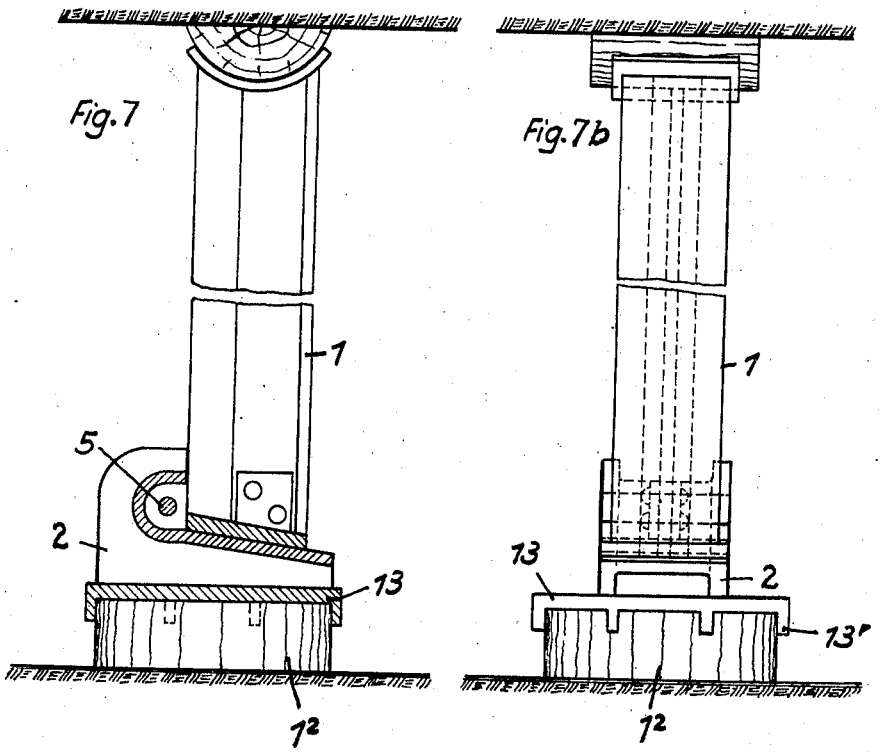
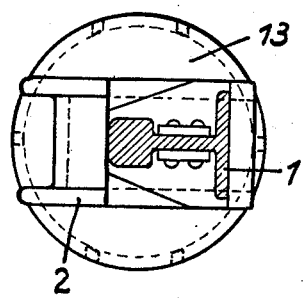
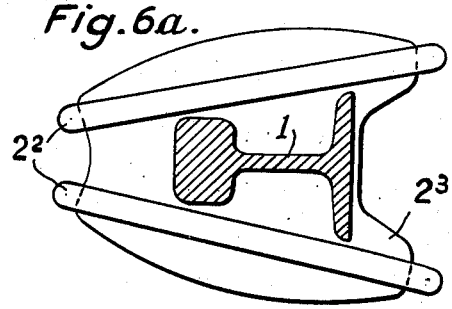
Inventors:
W. Wiebecke,
F. W. Mozz and
W. Hardieck
By Young, Emery & Thompson
Attorneys Feb. 13, 1940. W. WIEBECKE ET AL 2,190,556
MEANS FOR PULLING DOWN PIT PROPS OR PILLARS
Filed Dec. 23, 1937 6 Sheets-Sheet 5

Inventors:
W. Wiebecke,
F. W. Mozz and
W. Hardieck
By Young, Emery & Thompson
Attorneys

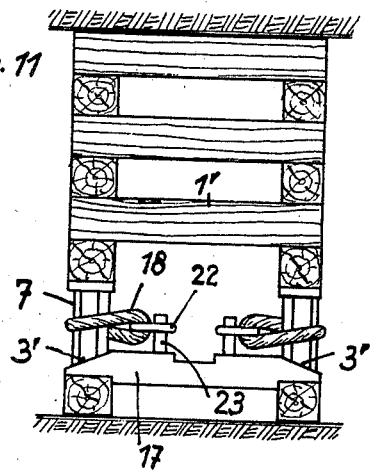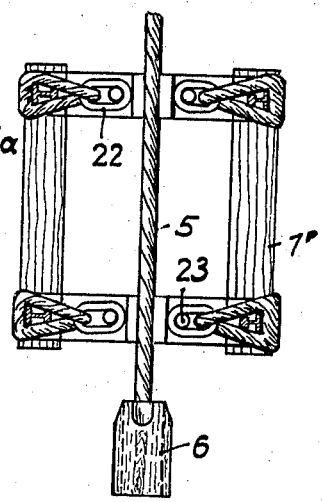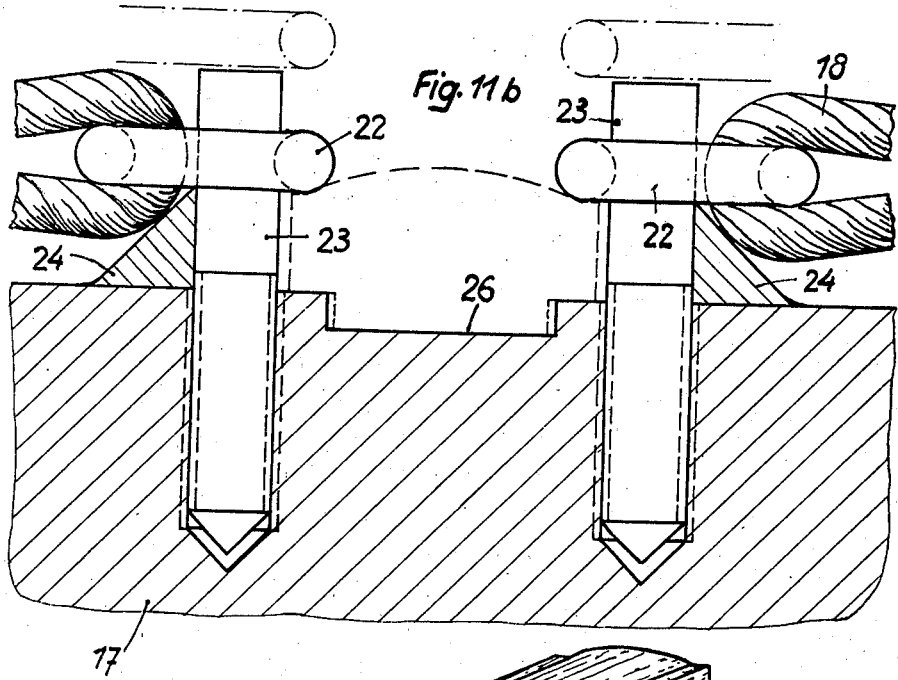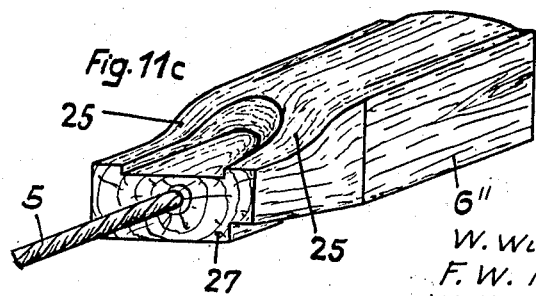

Patented Feb. 13, 1940

2,190,556

UNITED STATES PATENT OFFICE 2,190,556

MEANS FOR PULLING DOWN PIT PROPS OR PILLARS

Walter Wiebecke, Alsdorf, near Aachen, Friedrich Wilhelm Moll, Witten-Ruhr, and Walter Hardieck, Dortmund, Germany, assignors to the firm F. W. Moll Söhne, Maschinenfabrik, Witten, Germany Application December 23, 1937, Serial No. 181,450
In Germany December 28, 1936

19 Claims. (Cl. 262—1)

As elements in mining operations underground, use is made either of pit props (made of wood or iron) or of pillars which consist of a large number of pieces of wood or iron placed one over the other cross-wise. These props or pillars must as the mining work advances be removed and placed afresh at certain intervals of time. This removal of props or pillars which are under pressure is dangerous because the roof may come down. This collapse of the roof is even brought about artificially by taking away the props. A large number of devices are known by which it is possible to pull away the props or pillars from a certain distance therefrom. These methods have the disadvantage however that each prop or pillar must in a tedious manner be pulled away separately.

The invention relates to a method for the pulling away of pit props or pillars which are sub-divided into at least two parts movable in relation to each other. The invention renders possible convenient pulling away of a number of props or pillars of this kind standing in a row from a great distance and in an economic way and is characterized by the fact that by means of guides arranged on a number of props or pillars standing in a row a pulling member such as a rope or cable is passed, having at its end a wedge or striker, which when the rope is tightened produces relative movement of the parts of the props or pillars one after the other. In this way therefore, from a point free from danger it is possible by means of a winch to successively free the individual props or pillars standing in a row from pressure by moving the parts of the respective props or pillars (for example a top part and a bottom part) relatively to each other by a certain amount, in particular, by displacing them laterally. In this way the props or pillars collapse and can then be conveniently removed. If props or pillars consisting of two parts are used, it will be desirable to make the meeting surfaces of the parts sloping in order to facilitate the movement of the parts relatively to each other.

The carrying out of the method according to the invention can be effected by providing at least one part of each prop or pillar with a guide for the rope which carries the wedge or prop this guide being preferably formed of a stirrup-shaped member. The body of the parts of the props or pillars form one of the parts of the props or pillars themselves or may be interposed between two prop parts. A stirrup-shaped member bridging over the junction part of two prop parts, fixed to one prop part and ending at a distance from the hanging wall and the foot wall, may also be used.

For the purpose of pulling out pit props in accordance with the invention a rope is suitable provided with a wedge which rests against the stirrup shaped member forming the guide and which, when the rope is pulled, forces one part of the prop away from the other.

Props or pillars are known, the parts of which rest on each other with greatly inclined i. e. not self-arresting wedge surfaces and in which the knocking down is effected by releasing a bolt which in normal operation prevents the parts of the prop or pillar from slipping apart. Even with props or pillars of this kind the process according to the invention can be used, namely by the method that the bolt is released by the wedge or striker carried by the rope.

A further improvement results if the upper parts or lower parts, or both of a prop are detachably connected to a tractive agent which pulls these parts away after the prop has ceased to be under pressure. In addition, the prop parts movable in relation to each other, can be provided with a form of connection which allows of a limited lateral displacement of the parts to each other. This connection may be made for example by short pieces of chain. A connection of this kind affords the advantage that when one part of the prop is pulled along the other part is carried with it.

Various constructional forms of the invention are illustrated by way of example in the annexed drawings, in which:

Figs. 1 and 1a are respectively an elevation and a plan of a pit prop with pull-away means.

Figs. 2 and 2a are respectively an elevation and plan of a pillar with pull-away means.

Figs. 3 and 3a are respectively a plan and elevation of a similar constructional form.

Fig. 4 is a diagram illustrating a pull-away installation.

Figs. 5 and 5a, 6 and 6a show two further constructional examples of pit props in elevation and plan.

Figs. 7, 7a and 7b show a further constructional example in elevation, plan and side-view.

Figs. 8 and 8a, 9 and 9a, illustrate two further constructional examples respectively in elevation and plan.

Figs. 11 and 11a show a similar constructional form in elevation and plan.

Figs. 11b and 11c show details of Figs. 11 and 11a on an enlarged scale.

Fig. 12 shows in plan a constructional form of the method.

Figure 10:
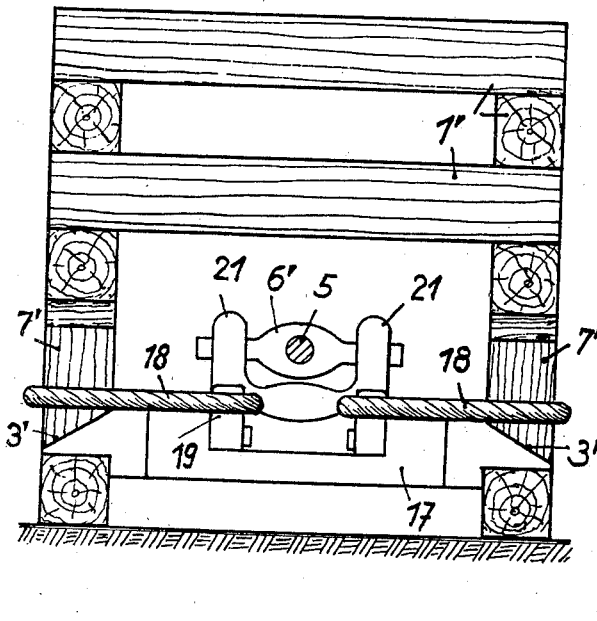
Figs. 10, 10a and 10b, are elevation, plan and side-views of the pulling away of a special design of pillar.

The prop according to Figs. 1 and 1a consists of an upper part 1 and a lower part 2. These parts rest against each other along the sloping surface 3. The bottom part 2 is in the form of a robust stirrup or shoe member which has a guide groove or opening 4 through which, by means of a winch (not shown) a rope or cable 5 can be drawn, which carries at its end a wedge 6. When this wedge 6 is drawn through the groove 4 the upper part of the prop 1 is forced laterally away from the lower part 2 and in this way the prop is relieved of pressure so that it collapses.

In the constructional form according to Figs. 2 and 2a instead of the prop a pillar is used which consists of pieces of wood 1' arranged in cross layers. Between the pieces of wood of the two lowest layers a double stirrup 2' is interposed on the wedge faces 3 of which iron intermediate pieces 7 rest. Through the two guide grooves 4 of the double stirrup or interconnecting member 2', the ropes 5 to be actuated by a winch can be drawn with the wedge 6, the intermediate pieces 7 being forced away to one side and the pillar left without support.

The constructional form of Figs. 3 and 3a only differs from that of Figs. 2 and 2a by the fact that the intermediate iron pieces 7 are replaced by pieces of wood 7'.

Of course in all constructional examples the parts of the prop or pillar may be made of any material such as iron or wood.

Fig. 4 shows in plan an installation for pulling down props in series. The illustration shows props in position working along the strike. Between the working face 8 (for example coal) and the packing 9 there are four rows of props, a, b, c and d, auxiliary props e not called upon to take up any particular pressure being also placed between the rows c and d. The props of the rows a, b, c, d may be of the type shown in Figs. 1 and 2, or of the type shown in Figs. 5 to 10. Through the guide in the props d a rope 5 is then passed which can be wound up on a winch drum 10. A second rope 5 also operated by a winch drum 10 is passed through the guides of the adjoining row of props c. The ropes carry at their ends wedges 6 staggered in relation to one another as shown, and are connected with each other by a stirrup piece 11. On actuating the winch drum 10 the wedges are one after the other pulled through the guides of the individual props of both rows, by which the props are freed from pressure. The staggering of the wedges 6 is effected in order that the props simultaneously gripped and deprived of pressure in the two rows of props lie in a plane which is about parallel with the existing cracks and clefts in the hanging-wall or those which may form. In this way the collapse of the hanging wall intended to take place after pulling away the props is assisted. The auxiliary props e are cleared away by the stirrup piece 11.

In the constructional example according to Figs. 5 and 5a the pit props consist of an iron upper part 1" and an angular stirrup 2". The guide for the rope 5 which carries the wedge or stop is formed on the one hand by the two legs of this stirrup and on the other hand by faces 12 on the other prop part 1" which is cut away for that purpose in its lower portion.

In Figs. 6 and 6a the stirrup which forms the bottom part of the prop consists of the link bodies or guides $2^2$ and the bottom plate $2^3$. The links are let into and fastened in grooves in the bottom plate. The guide groove for the rope 5 is in this case formed partly by the links $2^2$ and partly by the bottom plate $2^3$. This constructional form has the advantage that the forces of flexion on the support are absorbed by the links $2^2$ which act as tensile bands.

In the constructional form according to Figs. 7, 7a and 7b the stirrup 2 which forms the guide of the rope 5 is interposed between two prop parts of which the upper part 1 is made of iron and the lower part $1^2$ is made of wood and is of larger section. The guide body 2 is provided with a pressure plate 13 corresponding to the wood block and embracing the upper edge of the wood body by means of cams $13^1$ arranged in the shape of a crown.

The arrangement according to Figs. 7 and 7b has the advantage that the guide for the rope 5 lies at a somewhat greater distance above the footwall and that in addition the length of the top can be adapted to the particular conditions by means of a piece of wood $1^2$ of greater or lesser size. The piece of wood is laid in such manner that its grain runs in the direction of pressure. It is of course also possible for the wooden body to form the upper part of the prop just as the guide for the rope can be fitted at any desired point of the prop, namely near to the hanging wall or near to the footwall or in a middle position.

In the constructional form according to Figs. 8–8a, the stirrup $2^4$ which forms the guide is rigidly fixed for example by welding to the iron upper part 1. The stirrup is so arranged that it is at a distance both from the footwall and from the hanging wall. Between the iron upper part 1 and the wooden lower part $1^2$ an iron pressure plate 14 is interposed which is fixedly connected with the prop 1 and also if required with the stirrup $2^4$.

This form of construction has the advantage that the stirrup can be made very light and simple. Owing to being fixed to one of the prop parts it can conveniently be pulled away together with the latter. Here to of course the prop parts may be made of any material.

Figs. 9 and 9a show a similar constructional form in which the stirrup $2^5$ is designed as a hook and is particularly connected by a ring or a chain link 15 with the upper part of the prop. The free end of the hook $2^5$ forms a fork 16 which embraces the wooden bottom prop.

Figure 10B:
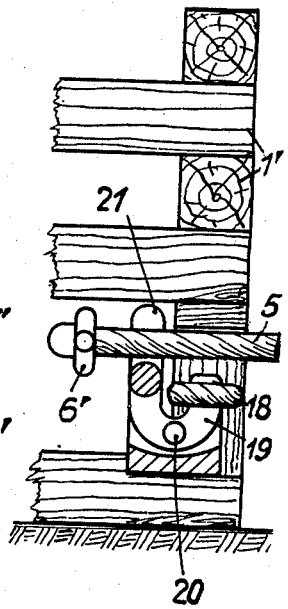
Figure 10A:
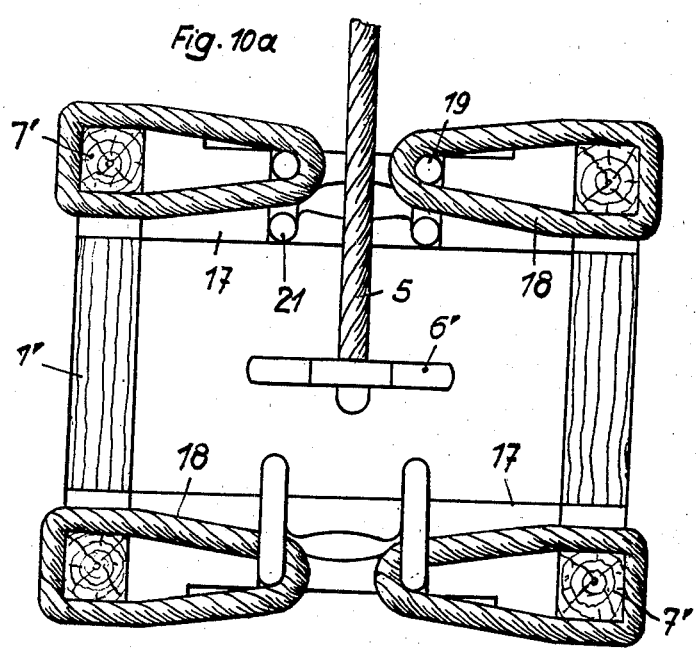

Figs. 10, 10a, 10b show the means for pulling away a wooden pillar which similarly to the constructional example of Figs. 2 and 3 consists of layers of wood pieces 1' arranged crosswise. The intermediate pieces 7' rest against the inclined non self-supporting wedge surfaces 3' of the intermediate body 17. In order to prevent sliding off on the surface 3' and consequently loss of pressure of the props in normal operation, rope loops 18 are provided which are placed over short upwardly directed arms of the hooks 19 mounted so that they can swing about pins 20 and which take the rope 5 between them by means of their elevated arms 21.

The pull rope 5 carries a stop member 6' which on impinging on the arms 21 turns the hooks over so that the rope loops are freed, thereupon the intermediate pieces 7' automatically slide outwards on the wedge surfaces 3' and the pillar is relieved of pressure.

The constructional form according to Figs. 11, 11a, 11b and 11c corresponds in principle to the constructional form according to Figs. 10, 10a, 10b. The rope loops 18 placed around the iron intermediate pieces 7 are by the chain links 22 placed round the elevated pins 23 of the intermediate body 17. The pins 23 are supported on the outside by means of triangular welded pieces 24 and with the body 17 form the limits of a guide for the rope 5, which carries a wedge at the free end. This wedge which is shown on a larger scale in Fig. 11c passes with its curved planks 25 beneath the rings 22 and pushes the latter upwards and slips them off the pins 23 so that the released intermediate pieces 7 slide down on the wedge surfaces 3' and the pillar is relieved of pressure. For the better guiding of the wedge 6'' the groove 26 is provided in the body 17, in which groove the wedge slides by its shoulder 27.

In all the constructional forms described of posts and pillars it is desirable for the guide for the rope carrying the stop or wedge to be provided with forwardly projecting guide surfaces for the wedge or stop.

Fig. 12 shows a constructional form of the method in which in addition to the pulling means for the wedge 6 there is also provided pulling means 28 by which prop parts which have become free of pressure are pulled away and can therefore be brought without danger to a distant point. The props in this case consist of an upper part 1 and a stirrup shaped lower part 2, the stirrup being able to be of any of the designs shown in the preceding figures (for example that according to Figs. 1, 1a). This stirrup has a groove through which the pulling means 5 for the wedge 6 can be drawn in order to force the upper part of the prop laterally from the stirrup. The pulling means is set in motion by a winch which is not shown.

The two pulling means 28 and 5 can be operated by a common drive, the driving drum for the pulling rope 28 which pulls out the prop parts being provided with a coupling of such a character as will engage only with a relatively slight resistance particularly after the prop has become free from pressure. For this purpose a friction clutch may for example be used.

The stirrups 2 which form the lower part of the prop are connected with the pulling rope 28 in such manner as to be easily detached (for example by simply holding, belaying or gripping). This rope 28 moves with a greater speed for example twice as great as that of the pulling rope 5, but the tractive force exerted by the drive is made substantially less than the tractive force for the rope 5. The mode of operation is as follows:

First of all on drawing the rope 5 through the wedge 6 the upper part of the prop is forced away from the stirrup 2 which forms the lower part, that is to say the prop is freed from pressure. The tensile force is then sufficient for the second pulling rope 28 to pull away the stirrup 2 with a corresponding lead relatively to the wedge 6, so that it can be released from the rope in a safe part of the mine lying farther back. With the stirrup 2 the upper prop part 1 is coupled for example by a short but suspended piece of chain so that on pulling up the stirrup the prop is also carried along. The connection of the two prop parts 1 and 2 is also of importance when no special pulling agency 28 is provided. The connecting means must in every case be so selected that the movement of the prop parts relatively to each other for freeing them from pressure is ensured.

What we claim as our invention and desire to secure by Letters Patent of the United States is:

1. An apparatus for pulling down mine props or pillars each of which is in at least two parts, comprising a shoe member forming one part of a prop, said member having a guide opening therein, a pulling means adapted to pass through the opening, and a wedge member on one end of the pulling member which when pulled by the pulling member and when the wedge member passes through the opening the wedge member will contact the other part of the prop to force a relative movement between the two parts of the prop.

2. An apparatus according to claim 1, in which the shoe member has a wedge surface on which the other part of the prop rests and on which the relative movement of the parts takes place.

3. An apparatus for pulling down mine props or pillars, comprising a shoe member having a wedge surface and a guide opening, said shoe member being adapted to be provided on an end of the prop, a pulling member adapted to pass through the guide opening, and a wedge member on one end of the pulling member which when pulled through the guide opening the wedge member will cause a relative movement between the shoe member and the prop.

4. An apparatus according to claim 1, in which the guide opening in the shoe member is formed by two arms.

5. An apparatus according to claim 3, in which the shoe member with the guide opening consists of a bottom part, and in which a pair of link guides are provided around the bottom part and adjacent each side of the prop.

6. An apparatus according to claim 3, in which the wedge surface of the shoe member is in the form of a pressure plate.

7. An apparatus according to claim 3, in which two shoe members are provided for two spaced props, and in which an interconnecting member is provided to connect the two shoe members together.

8. An apparatus according to claim 3, in which means is provided to articularly connect the shoe member with the prop.

9. An apparatus according to claim 3, in which the shoe member has a hook, and in which a chain link is provided interconnecting the shoe member with the prop.

10. An apparatus according to claim 1, in which the shoe member is provided with a fork to embrace one of the prop parts.

11. An apparatus according to claim 3, in which two shoe members are provided for two spaced props, and in which an interconnecting member is provided to connect the two shoe members together, including means to connect each prop with the interconnecting member which are released by the wedge member on the pulling member.

12. An apparatus for pulling down mine props or pillars, comprising a shoe member on which the prop is adapted to rest and having an opening adjacent the side of the prop, and a pulling member adapted to pass through the opening and having a wedge surface whereby when the pulling member is pulled through the opening by contacting the shoe member and the side of the prop the wedge surface will cause relative movement between the prop and the shoe member to free the prop and the shoe member.

13. An apparatus for pulling down mine props or pillars, comprising a shoe member on which the prop is adapted to rest and having an opening adjacent the side of the prop, a wedge member adapted to pass through the opening, and means for pulling said wedge member through the opening whereby the wedge member will contact the shoe member and the side of the prop to cause relative movement between the prop and the shoe member to free the prop and the shoe member.

14. An apparatus according to claim 13, in which the means includes a rope and a winding drum.

15. An apparatus for pulling down mine props or pillars, comprising a shoe member on which the prop is adapted to rest, a wedge member adapted to cooperate with the shoe member to cause relative movement between the shoe member and the prop to free the prop and shoe member, and means for operating the wedge member from a point remote from the location of the prop.

16. An apparatus for pulling down mine props or pillars, comprising a shoe member on which each prop is adapted to rest, a wedge member adapted to cooperate with each shoe member to cause relative movement between the shoe member and the prop to free the prop and shoe member, and means for operating the wedge member to successively cause relative movement between successive prop and shoe members from a point remote from all the props.

17. An apparatus for pulling down a row of mine props, comprising a shoe member for each prop on which the prop is adapted to rest, a wedge member adapted to cooperate with each shoe member to cause relative movement between the shoe member and the prop to free the prop and shoe member, and means for pulling the wedge member successively from one shoe member to the adjacent shoe member to successively pull down the row of mine props from a point remote from all the props.

18. An apparatus according to claim 17, in which the means includes a single cable which passes adjacent each shoe member and in which a winding drum is provided to draw the rope and finally the wedge member along the row of props.

19. An apparatus for pulling down a row of mine props, comprising a member for each prop on which the prop is adapted to rest, a wedge member, a single cable attached to the wedge member, and means at a point remote from the row of props for applying a pull on the cable to successively force the wedge member between the first-named member and the prop to successively pull down the row of mine props.

WALTER WIEBECKE.
FRIEDRICH WILHELM MOLL.
WALTER HARDIECK.